Sept. 30, 1941.  C. C. HARRAH  2,257,604
TIRE CASING
Filed Jan. 31, 1940  2 Sheets-Sheet 1
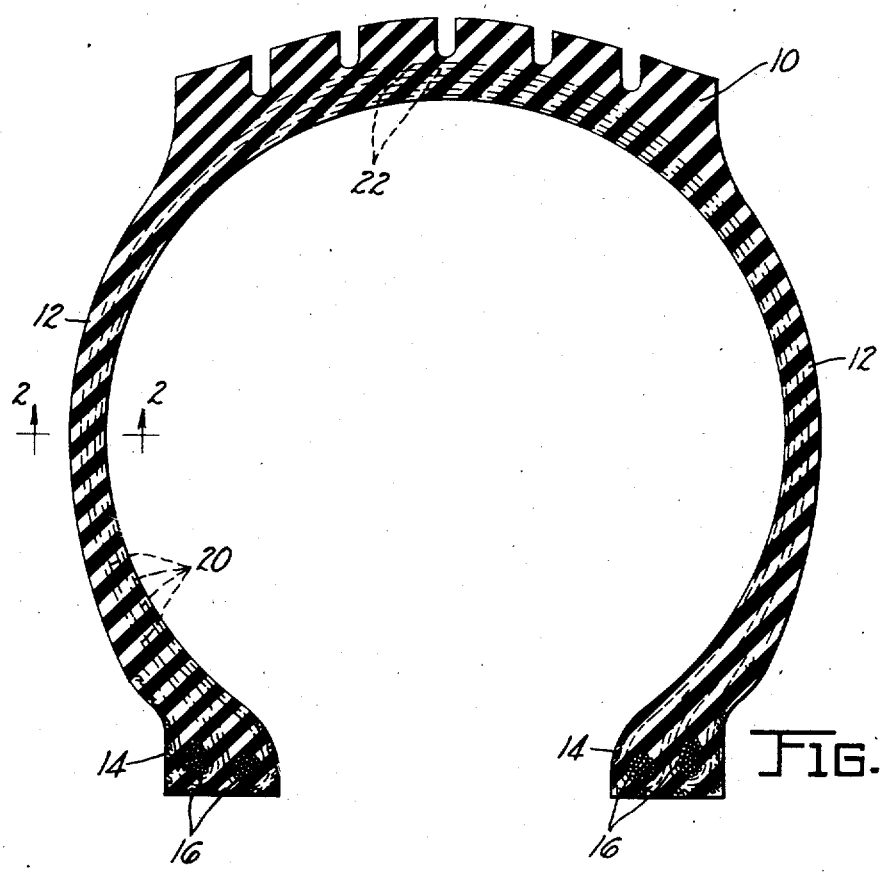
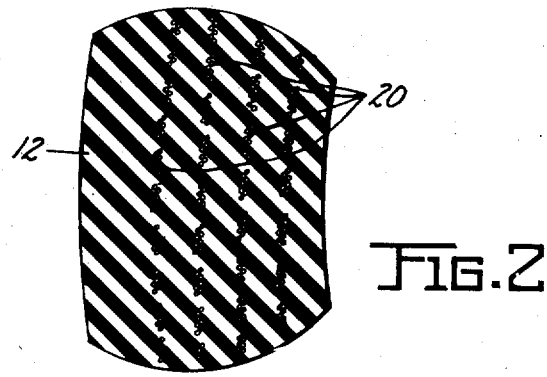
INVENTOR.
CLAYTON C. HARRAH
BY Booth & MacDuff
ATTORNEYS.

Sept. 30, 1941. C. C. HARRAH 2,257,604
TIRE CASING
Filed Jan. 31, 1940 2 Sheets-Sheet 2
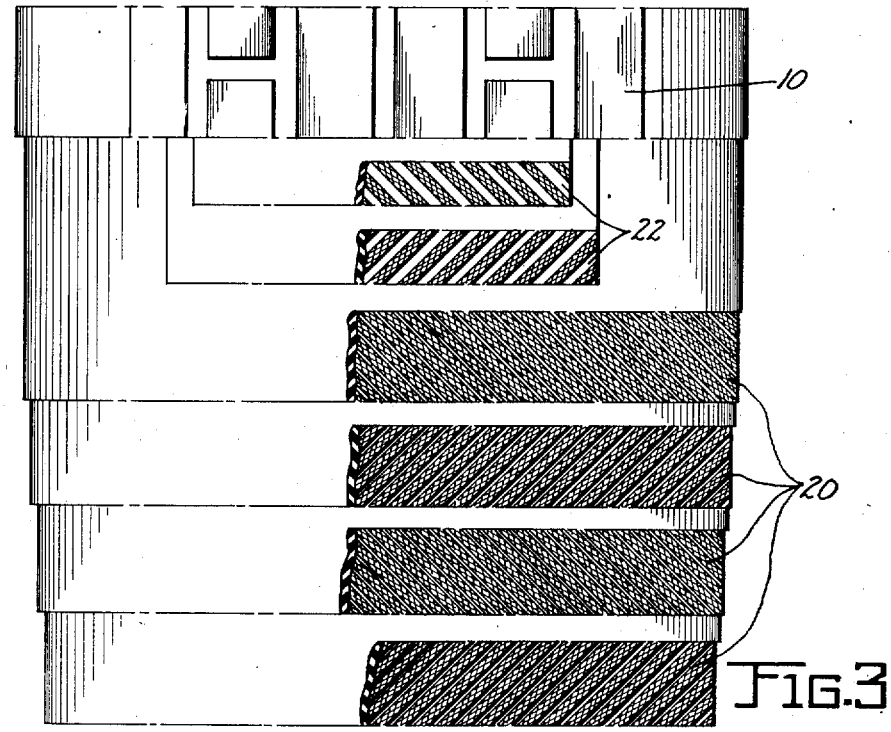
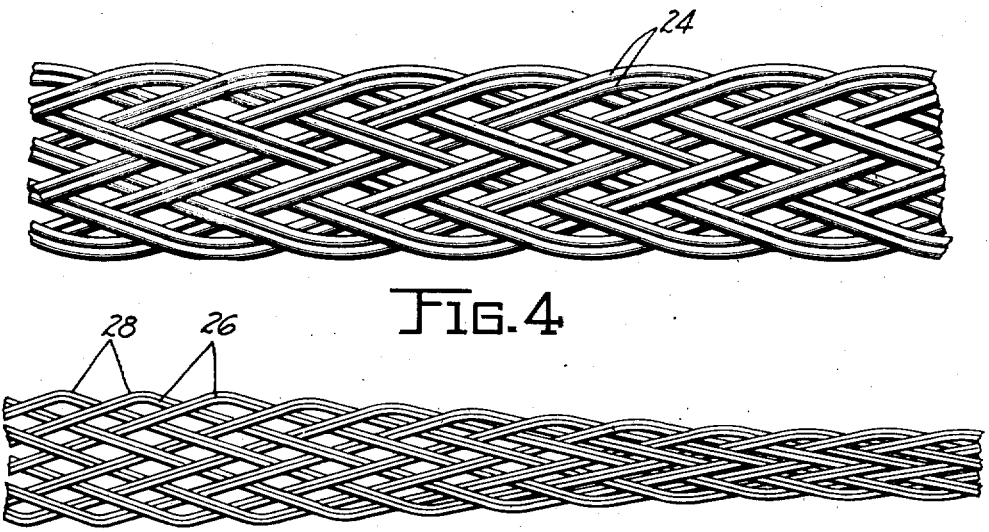
INVENTOR.
CLAYTON C. HARRAH
BY Booth & MacDuff
ATTORNEYS.

Patented Sept. 30, 1941

2,257,604

UNITED STATES PATENT OFFICE 2,257,604

TIRE CASING

Clayton C. Harrah, Niles, Mich., assignor to National Standard Company, Niles, Mich., a corporation of Michigan Application January 31, 1940, Serial No. 316,489

3 Claims. (Cl. 152—356)

This invention relates to tire casings and more particularly to casings for pneumatic tires in which the rubber or the like is reinforced by metal wires.

In the manufacture of tire casings it is essential that the rubber or like material of which the casing is made be reinforced by tensile members extending through the side wall and tread portions of the casing from one bead to the other. Heretofore such tensile members have been formed of textile materials which tend to stretch during use and large numbers of which are required to provide the necessary strength.

According to the present invention such tensile members are formed of metal wires whose greater strength enables them to be used in lesser numbers than textile materials so that a thinner lighter tire is formed. The invention relates primarily to the construction of such tensile members and the manner of incorporating them into a tire casing to provide a casing which will withstand the strains and flexures imposed by service on vehicles.

One of the objects of the invention is to provide a tire casing reinforced by tension members formed of metal wires in which the tension on all of the wires is equalized. This is very important since unequal tension on the wires might cause breakage or cutting of the rubber of the casing by the most highly stressed wires.

Another object of the invention is to provide a tire casing reinforced by metal elements which have a high degree of lateral flexibility. This not only enables a tire to be formed with relatively narrow beads but also makes possible highly flexible casing walls.

Still another object of the invention is to provide a tire casing reinforced by metal elements which are resilient longitudinally in tension or compression or both. Where several layers of reinforcing elements are used this is highly important to permit free flexing of the tire wall and it also assists in absorbing impacts.

Yet another object of the invention is to provide a tire casing reinforced by metal elements which are securely bonded to the rubber or like material of which the casing is formed. Preferably the metal elements are formed with a relatively open structure so that the rubber of the tire may bond to itself through the openings to anchor the elements firmly in place. In addition to the mechanical bond so formed the rubber may also be bonded chemically to the metal surfaces.

The above and other objects, advantages and novel features of the invention will be apparent from the following description of the embodiments shown in the accompanying drawings, in which:

Figure 1 is a transverse section through a tire casing embodying the invention;

Figure 2 is an enlarged partial section similar to Figure 1;

Figure 3 is an elevation with successive layers broken away showing the construction of the casing;

Figure 4 is an enlarged plan view of one type of reinforcing material; and

Figure 5 is a view similar to Figure 4 of another type of reinforcing material.

The tire as shown comprises a tread portion 10 and side wall 12 terminating in beads 14 reinforced by annular metallic elements 16. The tread and side walls of the tire are reinforced by a plurality of layers of tension elements 20 which turn up around the annular reinforcement 16 and extend diagonally through the side walls and tread from one bead to the other. If desired, one or more breaker strips 22 may be provided under the tread portion of the tire formed of the same material as the reinforcements 20.

One desired type of reinforcement according to the present invention is illustrated in Figure 4 and comprises a flat braid of metal wires 24 extending diagonally back and forth across the braid, over and under each other. The braid illustrated is formed of nine pairs of wires passing alternately over and then under two other pairs of wires although braids laid in any other desired manner might be used satisfactorily.

The wires 24 are preferably coated with zinc or copper plating or with a bonding lacquer so that when they are vulcanized into the wire casing the rubber of the casing will adhere to the surface of the wires. Due to the structure of the braid a plurality of openings are provided therethrough from one side to the other and during vulcanization the rubber of the tire casing will bond to itself through these openings. Thus the braid is secured in the tire both by a mechanical and a chemical bond so that it is securely anchored thereto and will not be loosened during service.

One important advantage of a braid construction of the type shown in Figure 4 is that the several wires are equally stressed throughout their length. This is due to the fact that the wires cross back and forth across the braid so that when the ends of the braid are fastened as to the reinforcement 16, the wires will be equally tensioned so that no one wire will tend to break before the others, or to cut through the rubber of the tire due to high tension thereon.

Since the braid is relatively flat and may be formed of relatively light wires of the magnitude of .006" in diameter the braid will be extremely flexible laterally. This enables it to be bent sharply around the reinforcement 16 so that a narrow bead is formed and further contributes to high flexibility in the casing walls. The braid may also be bent in its own plane so that it may be laid up closely around the beads and through the tire wall without any pre-stretching.

Due to the fact that the tire wall has a certain amount of thickness it is essential that the reinforcing members be resilient in tension or compression or both, so that the wall may flex readily. The braid of the present invention possesses these characteristics to a relatively high degree, being both stretchable and compressible to permit ready flexure of the tire walls through a relatively sharp radius. In addition, the longitudinal resilience of the reinforcements enables the casing to withstand impacts to a greater extent without damage.

Another important advantage of the braid of the present invention is that it may be compressed widthwise in its own plane. By compressing the braid widthwise at the point where it passes around the bead reinforcements, the spacing of adjacent braids at the tread portion of the tire may be made closer so that greater strength is provided in each layer of reinforcing elements.

In building up a tire casing according to the present invention it may be desired to place the braids in the casing under tension. This will decrease to some extent the extensibility of the braids, but will produce a corresponding increase in their compressibility so that the lateral flexibility of the casing wall is not impaired. At the same time tensioning of the braids will reduce the tendency of the casing to increase in diameter in service.

Figure 5 illustrates a braid similar to that of Figure 4 formed of wires 26 braided in a flat tape in the same manner as in Figure 4. However, as shown at the left of Figure 5, the tape has been expanded widthwise to increase the sharpness of the bends at points 28 where the wire reverses its direction at the edges of the tape. A braid expanded in this manner becomes much more resilient in both tension and compression, and in addition provides wider spaces between the wires through which the rubber of the casing may bond to itself.

In utilizing this braid in a tire it may be placed in the tire in its fully expanded condition as shown at the left of Figure 5 to provide an extremely resilient tire. However, I prefer to place the expanded braid in the tire casing under tension so that it assumes substantially the position illustrated at the right of Figure 5. It will be noted that in tensioning the expanded braid the wires cannot be pulled fully back to the position occupied in the original braid before expansion and that the bends at the edges of the braid will be sharper than in an unexpanded braid. Therefore, in this condition the braid possesses greater resilience particularly in compression than an unexpanded braid, and contributes to greater flexibility in the casing walls.

Due to the greater strength of the metallic material of the present invention than conventional fibrous materials heretofore used in tire casings, a tire casing can be made much thinner and lighter than one reinforced by textile cords or the like. This not only results in a saving in the cost of production, but reduces the weight which must be carried by a vehicle and provides a casing which is much easier to handle. Further, since the metal wires will not take a permanent stretch under ordinary load conditions the tire will retain its original diameter throughout its entire period of use and will not increase in size as is common with textile reinforced tires.

While two embodiments of the invention have been illustrated and described in detail it will be understood that the scope of the invention is not to be limited thereto nor otherwise than by the appended claims. This application is a continuation in part of my co-pending application No. 251,892, filed January 20, 1939.

What is claimed is:

1. A tire casing comprising a tread and side walls formed of rubber or the like and side beads containing annular reinforcements and having imbedded therein and being reinforced solely by a plurality of layers of metallic wire elements extending from one bead diagonally through the side walls and tread to the other bead, each wire element comprising a section of flat wire braid made up of wires extending back and forth diagonally across the braid and over and under each other continuously throughout the section and spaced apart to leave openings through the braid between the wires, the rubber of the tire casing being bonded to the surface of the wires and to itself around and between the wires through the openings in the braid.

2. A tire casing comprising a tread and side walls formed of rubber or the like and side beads containing annular reinforcements and having imbedded therein a plurality of layers of metallic wire elements extending from one bead diagonally through the side walls and tread to the other bead, each wire element comprising a section of flat wire braid made up of wires extending back and forth diagonally across the braid and over and under each other continuously throughout the section and spaced apart to leave openings through the braid between the wires, the ends of the braids being turned up around the annular reinforcements in the beads and being compressed widthwise at said reinforcements so that they may be spaced closely.

3. A tire casing comprising a tread and side walls and reinforced side beads and having imbedded therein and being reinforced solely by a plurality of layers of metallic wire elements extending diagonally around the tire from one bead through the side walls and tread to the other bead, each wire element comprising a section of flat wire braid made up of wires extending diagonally back and forth across the braid and over and under each other, continuously throughout the section from one bead to the other with the wire spaced apart and formed with relatively sharp bends at the edges of the braid to provide open spaces between the wires and high longitudinal resilience.

CLAYTON C. HARRAH.